United States Patent
Kaplan et al.

(10) Patent No.: US 6,680,904 B1
(45) Date of Patent: Jan. 20, 2004

(54) BI-DIRECTIONAL CHAINING OF NETWORK ACCESS PORTS

(75) Inventors: Menachem Kaplan, Petach Tikva (IL); David Zelig, Givataim (IL); Roy Kinamon, Tel Aviv (IL); Eli Aloni, Tzur-Igal (IL); Ron Sdayoor, Kiryat (IL); Eric Paneth, Givataim (IL); Eli Magal, Tel Aviv (IL)

(73) Assignee: Orckit Communications Ltd., Tel Aviv (IL)

( * ) Notice: Subject to any disclaimer, the term of this patent is extended or adjusted under 35 U.S.C. 154(b) by 0 days.

(21) Appl. No.: 09/472,683

(22) Filed: Dec. 27, 1999

(51) Int. Cl.[7] .................... G01R 31/08; H04L 12/66; H04L 12/28; H04J 3/16
(52) U.S. Cl. ................ 370/217; 370/352; 370/392; 370/395.1; 370/465
(58) Field of Search ................ 370/216, 217, 370/352–356, 389, 392, 395.1, 465, 466; 340/2.28, 2.24; 710/110, 129, 131, 132; 712/31, 39; 709/208, 209, 225, 229; 375/222

(56) References Cited

U.S. PATENT DOCUMENTS

| | | | |
|---|---|---|---|
| 5,899,582 A | * | 5/1999 | DuLac .................... 386/125 |
| 6,181,715 B1 | * | 1/2001 | Phillips et al. .............. 370/493 |
| 6,215,863 B1 | * | 4/2001 | Bennett, III et al. .... 379/221.09 |
| 6,219,354 B1 | * | 4/2001 | Fink et al. .................. 370/463 |
| 6,317,415 B1 | * | 11/2001 | Darnell et al. .............. 370/230 |
| 6,345,051 B1 | * | 2/2002 | Gupta et al. ............. 370/395.2 |
| 6,404,861 B1 | * | 6/2002 | Cohen et al. ............ 379/93.01 |
| 6,424,657 B1 | * | 7/2002 | Voit et al. .................... 370/412 |

OTHER PUBLICATIONS

Dave Allen et al, "An "Optimized for ATM" ADSL Access Architecture using SDP", 7 pages, ADSL Forum 98–221, Nov. 17th to 20th, 1998, Los Angeles, CA, USA.

"Vortex Chip Set: Introduction", Preliminary Issue 1, 16 pages, Jun. 1999, PMC–Sierra, Inc., BC Canada.

* cited by examiner

Primary Examiner—Duc Ho
(74) Attorney, Agent, or Firm—Abelman, Frayne & Schwab

(57) ABSTRACT

Network access apparatus includes first and second master units, each having a physical interface to a packet-switched network. A plurality of slave units, each slave unit having one or more ports to respective subscriber lines, are linked by a plurality of physical interface lines in one or more daisy chains, in which the slave units are mutually connected in series by the physical interface lines therebetween. Each daisy chain includes at least a first slave unit connected by one of the physical interface lines to the first master unit and a last slave unit connected by another of the physical interface lines to the second master unit.

26 Claims, 9 Drawing Sheets

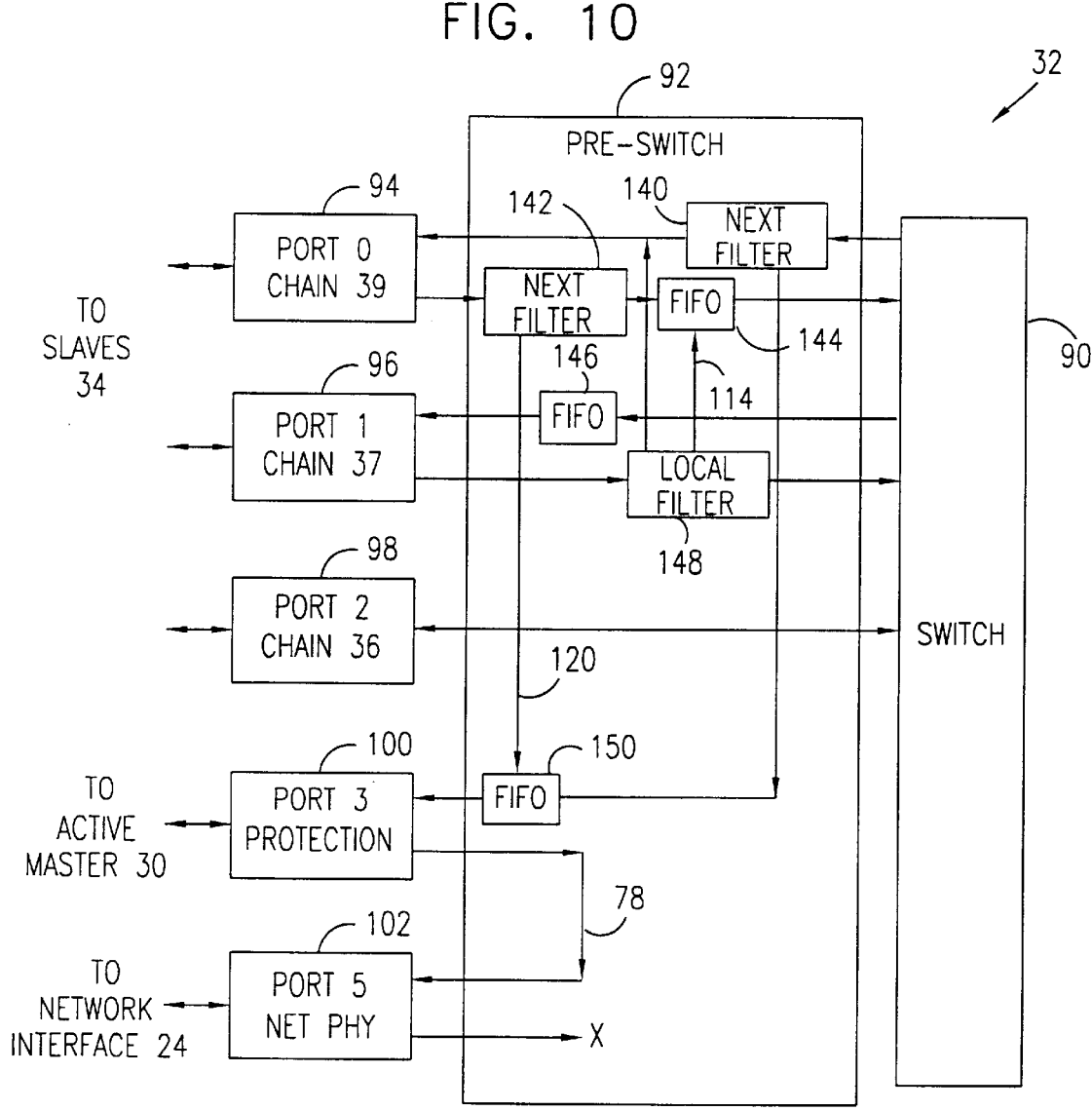

BI-DIRECTIONAL CHAINING OF NETWORK ACCESS PORTS

FIELD OF THE INVENTION

The present invention relates generally to high-speed data communication systems, and specifically to digital subscriber line systems.

BACKGROUND OF THE INVENTION

Digital Subscriber Line (DSL) is a modem technology that enables broadband digital data to be transmitted over twisted-pair wire, which is the type of infrastructure that links most home and small business subscribers to their telephone service providers. DSL modems enable users to access digital networks at speeds tens to hundreds of times faster than current analog modems and basic ISDN service. DSL thus opens the most critical bottleneck in local-loop access to high-speed networks, such as Asynchronous Transfer Mode (ATM) and Internet Protocol (IP) networks, without requiring major investments in new infrastructure. A range of DSL standards have been defined, known generically as "xDSL," wherein the various standards have different data rates and other associated features but share common principles of operation.

DSL subscribers are connected to high-speed networks through Digital Subscriber Line Access Multiplexer (DSLAM) systems. Because of the high cost of network bandwidth, a single DSLAM must typically be designed to serve between 100 and 1000 subscribers and to concentrate their traffic through one or a few network trunks. The need to serve such a large and potentially variable number of subscribers in the one DSLAM has led to the development of "multi-shelf" access architectures.

FIG. 1 is a block diagram that schematically illustrates a DSLAM system 20 implementing a multi-shelf architecture, as is known in the art. System 20 comprises a master unit 25 coupled to multiple slave units 27 in a star configuration. Master unit 25 communicates with a core network 22, such as an ATM network. The master unit comprises a core network interface element 24, providing the necessary physical layer (PHY) and data link layer (for example, ATM) functions. A concentrator 26 performs higher-level functions, including VPI/VCI translation for the ATM network, and multiplexes downstream and upstream packets, or cells, among slave units 27. Each slave unit typically comprises a switching core 29, coupled to a plurality of ports 28 serving respective subscriber premises via suitable DSL modems. In the physical implementation of system 20, each such slave unit occupies its own shelf in an electronics rack, and this is the reason for the use of the term "multi-shelf."

FIGS. 2A and 2B are block diagrams that schematically illustrate topologies known in the art for use in multi-shelf access systems, such as that shown in FIG. 1. FIG. 2A shows a simple star configuration. In a redundant star configuration, shown in FIG. 2B, each slave unit is connected to two or more alternative master units, so as to provide protection in case of a failure in one of the master units.

SUMMARY OF THE INVENTION

It is an object of some aspects of the present invention to provide an improved multi-shelf access architecture.

It is a further object of some aspects of the present invention to provide apparatus and methods for efficient, high-speed transfer of data packets within an access multiplexer system.

It is still a further object of some aspects of the present invention to improve the robustness and reliability of multi-shelf access systems.

In preferred embodiments of the present invention, a multi-shelf access system comprises two master units ("masters") and a plurality of slave units ("slaves") One of the masters serves as an active master, through which the slaves normally receive data packets from a core network and transmit packets back upstream to the network. The other master is termed a standby master. The slaves are connected in one or more daisy chains between the active and standby masters, and are configured so that both downstream and upstream packets can be transmitted in either direction along each of the chains, i.e., from or to either of the two masters. Thus, if a failure occurs in any one of the slaves or in a link between them, the traffic direction in the chain in which the failure has occurred is simply reversed so as to run through the standby master. Substantially no reprogramming of the slaves is required for this purpose. All of the slaves (except possibly a slave that has failed) continue to provide service to subscribers, typically with only a short interruption until corrective action is completed.

Preferably, the upstream packets are bicast by the active master to both the core network and to the standby master. The standby master also transmits the upstream packets to the core network, in order to protect against faults in the network interface of the active master unit.

In some preferred embodiments of the present invention, each slave comprises a pre-switch, which examines each packet passed down its respective chain to determine whether the packet is destined for any of the ports on that slave. Preferably, every packet passed between the masters and slaves has a pre-switch address. If the packet is addressed to a particular slave, the pre-switch on that slave conveys the packet to a switch or switching fabric of the slave, which routes the packet to the appropriate port. If the packet is a multicast packet with an appropriate pre-switch address, the pre-switch both conveys a copy of the packet to the switch or switching fabric of the slave and passes the packet on down the chain. The pre-switch similarly accepts packets carrying a "next" address, i.e., packets that are sent from one slave to its immediate neighbor for topology detection and diagnostics. Otherwise, the pre-switch rejects the packet and passes it on to the next slave along the chain.

The pre-switch thus reduces the burden on the switching fabric of the slave and ensures that packets are passed down the chain at the full data rate supported by the master-slave interface. Furthermore, in the case of a fault in the slave, the pre-switch simply passes all packets through to the next slave in the chain, so that the effect of the fault is limited as far as possible.

Preferably, the slave pre-switch is bidirectional, i.e., it treats packets passed both up and down the chain in substantially the same manner. The pre-switch thus supports the failure protection mechanism described hereinabove, wherein the traffic direction is reversed in response to a failure in the chain.

There is therefore provided, in accordance with a preferred embodiment of the present invention, network access apparatus, including:

first and second master units, each including a physical interface to a packet-switched network;

a plurality of slave units, each slave unit including one or more ports to respective subscriber lines; and a plurality of physical interface lines, which link the slave units in one or more daisy chains, in which the slave units are mutually connected in series by the physical interface lines therebetween, each daisy chain including at least a first slave unit connected by one of the physical interface lines to the first master unit and a last slave unit connected by another of the physical interface lines to the second master unit.

Preferably, in normal operation, downstream data packets received from the network are passed from the first master unit to each of the daisy chains via the first slave unit in each chain, and upstream data packets received by the slaves in each chain from the subscriber lines are passed via the first slave unit in the chain to the first master unit for transmission over the network. Further preferably, the apparatus includes a protection interface, which couples the second master unit to the first master unit, and over which interface data packets are conveyed between the first and second master units in case of a fault. Most preferably, the first master unit bicasts the upstream data packets that it receives from the slave units to the network and, via the protection interface, to the second master unit, which transmits the upstream data packets to the network.

Preferably, in case of a fault at a location in one of the daisy chains, data flow in a portion of the daisy chain between the location of the fault and the second master unit is reversed, so that the downstream data packets are passed from the second master unit to the slave units in the portion of the daisy chain via the last slave unit in the chain, and the upstream data packets are passed by the last slave unit to the second master unit. Further preferably, the downstream packets for the slave units in the portion of the daisy chain between the location of the fault and the second master unit are conveyed to the second master unit from the first master unit via another one of the daisy chains.

In a preferred embodiment, each of the first and second master units includes:
  a switch, configured to route data packets between the respective physical interface and the one or more daisy chains; and
  a pre-switch, which in the event of a fault at a location in one of the daisy chains, re-routes at least a portion of the data packets exchanged with one or more of the slaves in the daisy chain in which the fault has occurred through another one of the daisy chains. Preferably, the pre-switch re-routes the data packets such that substantially no reconfiguration of the switch is required responsive to the fault.

In a further preferred embodiment, each of the slave units includes:
  a switch fabric including one or more switches, which convey data packets to respective ports on the switch to which the packets are addressed; and
  a pre-switch, which receives the data packets from one of the physical interface lines connected to the slave unit and passes those of the data packets that are addressed to any of the ports on the slave unit to the switch fabric, while passing packets not addressed to any of the ports on the slave unit for output through another of the physical interface lines.

Preferably, each of the slave units is coupled to receive packets transferred thereto from the first and second master units over first and second ones of the physical interface lines, respectively, and the pre-switch passes the packets received through the first and second physical interface line and addressed to any of the ports on the slave unit to respective first and second addresses in the switch fabric. Further preferably, in response to a reversal of a direction of data flow in the daisy chain, the first and second addresses are swapped in the pre-switch, so that substantially no reconfiguration of the switch fabric is required.

In a preferred embodiment, the network includes an asynchronous transfer mode (ATM) network. In another preferred embodiment, the network includes an Internet protocol (IP) network.

There is further provided, in accordance with a preferred embodiment of the present invention, in a network access multiplexing system, in which a master unit is connected by a physical interface to a packet-switched network, a slave unit configured to be coupled to the master unit in a daisy chain of such slave units, the slave unit including:
  a plurality of ports, for coupling the slave unit to respective subscriber lines;
  first and second physical interfaces, coupled to exchange packets with preceding and succeeding units, respectively, along the daisy chain;
  a pre-switch, coupled to receive packets from the first physical interface and responsive to address data carried by the packets, to sort the packets such that packets addressed to the slave unit are retained, and packets addressed to the succeeding units are passed to the second physical interface; and
  a fabric of one or more switches, which convey the retained packets to the ports, responsive to the address data.

Preferably, the pre-switch is further coupled to receive packets transferred thereto from the second physical interface and to sort the packets in like manner to the packets received through the first physical interface. Most preferably, the retained packets that were received from the first and second physical interfaces and are passed by the pre-switch to the switch fabric are identified by respective first and second port numbers, wherein in response to a reversal of a direction of data flow in the daisy chain, the first and second port numbers are swapped in the pre-switch, so that substantially no reconfiguration of the switch fabric is required in response to the reversal.

Further preferably, when one of the packets received by the pre-switch includes a multicast packet addressed to one or more of the ports on the slave unit, the pre-switch sorts the multicast packet such that one copy of the packet is retained and another copy of the packet is passed to the second physical interface.

Preferably, in the event of a fault in the switch fabric, the pre-switch continues to pass the packets addressed to the succeeding units on to the succeeding units without significant interruption.

There is also provided, in accordance with a preferred embodiment of the present invention, a method for providing access to a network, including:
  coupling first and second master units to interface with the network;
  linking a plurality of slave units, each slave unit including one or more ports to respective subscriber lines, in a daisy chain between the first and second master units;
  conveying initial downstream data packets, received from the network by one of the master units, along the daisy chain in a first direction, so as to deliver the packets to the ports of the slave units; and
  in the event of a fault in the daisy chain, conveying further downstream data packets, received from the network by one of the master units, along the daisy chain in a second direction, opposite to the first direction, so as to deliver the further packets to the ports of at least some of the slave units.

Preferably, the initial and further downstream packets are received from the network by the first master unit, and conveying the further downstream packets in the second direction includes conveying the further downstream packets from the first master unit to the second master unit, and then conveying the further downstream packets from the second master unit to the daisy chain. Most preferably, conveying the further downstream packets from the first master unit to the second master unit includes linking further slave units in an additional daisy chain between the first and second master units, and conveying the further downstream packets from the first master unit to the second master unit over the additional daisy chain.

Further preferably, the method includes conveying initial upstream data packets, received by the slave units from the subscriber lines, along the daisy chain in the second direction so as to transmit the upstream data packets via the first master unit over the network, and in the event of the fault, conveying further upstream data packets received by one or more of the slave units along the daisy chain in the first direction via the second master unit. Most preferably, the method includes bicasting the upstream data packets from the first master unit to the network and to the second master unit, which transmits the bicast upstream data packets over the network.

Preferably, conveying the initial downstream data packets along the daisy chain includes pre-switching the packets at each of the slave units, so that packets not addressed to any of the ports on the slave unit are passed to the next slave unit in the daisy chain, while packets that are addressed to one or more of the ports on the slave unit are passed to a switch fabric that directs the packets to the ports to which they are addressed.

The present invention will be more fully understood from the following detailed description of the preferred embodiments thereof, taken together with the drawings in which:

BRIEF DESCRIPTION OF THE DRAWINGS

FIG. 10 is a block diagram that schematically illustrates details of the standby master in the system of FIG. 5 under the fault conditions of FIG. 8, in accordance with a preferred embodiment of the present invention.

DETAILED DESCRIPTION OF PREFERRED EMBODIMENTS

Figure 3:
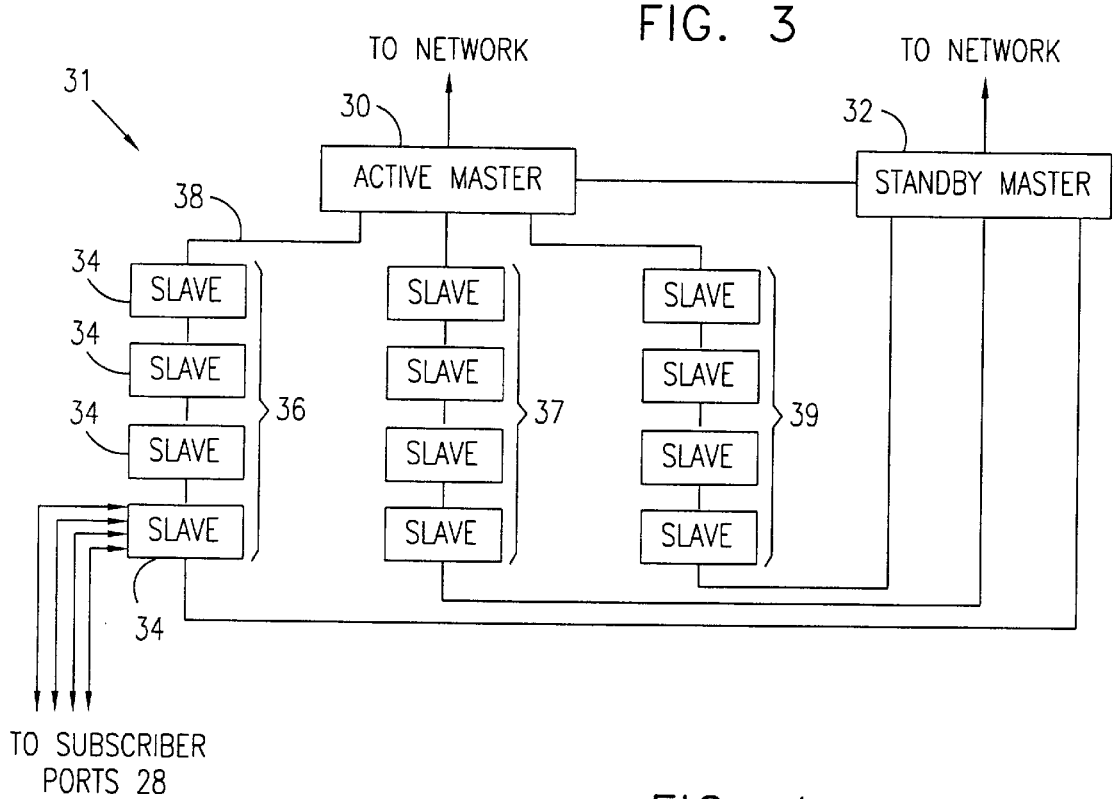
FIG. 3 is a block diagram that schematically illustrates the topology of a multi-shelf access system, in accordance with a preferred embodiment of the present invention.

FIG. 3 is a block diagram that schematically illustrates a multi-shelf access system 31, in accordance with a preferred embodiment of the present invention. System 31 is preferably a DSLAM, which provides subscriber access to an ATM network. Alternatively, system 31 may be configured for providing broadband access to substantially any high-speed, packet-switched network, such as an IP network, over substantially any suitable communications infrastructure. Some of the principles embodied in this system may also be applied in core network switching devices.

Figure 1:
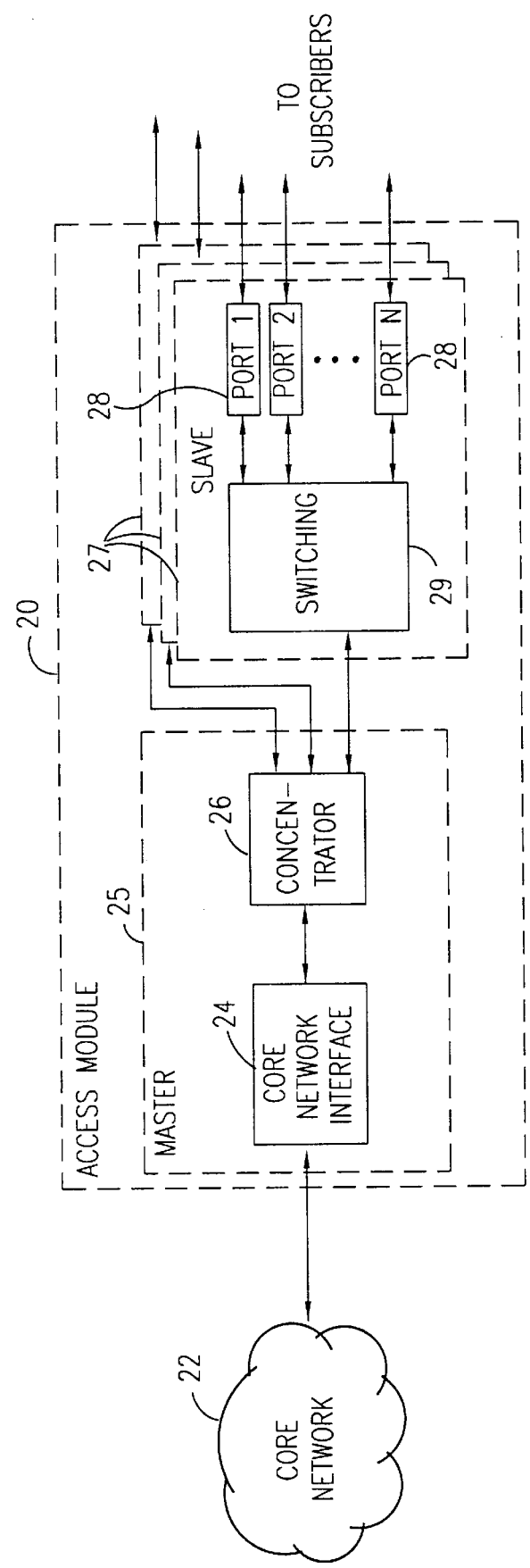
FIG. 1 is a block diagram that schematically illustrates a multi-shelf access system, as is known in the art.
Figure 2A:
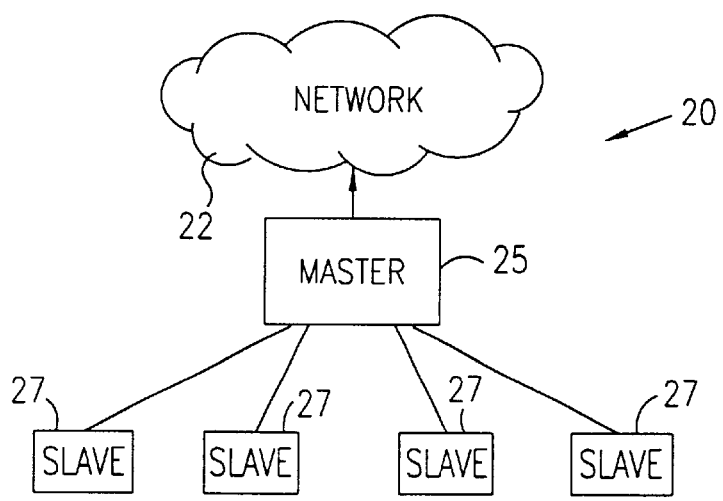
FIGS. 2A and 2B are block diagrams that schematically illustrate multi-shelf system topologies that are known in the art.
Figure 2B:
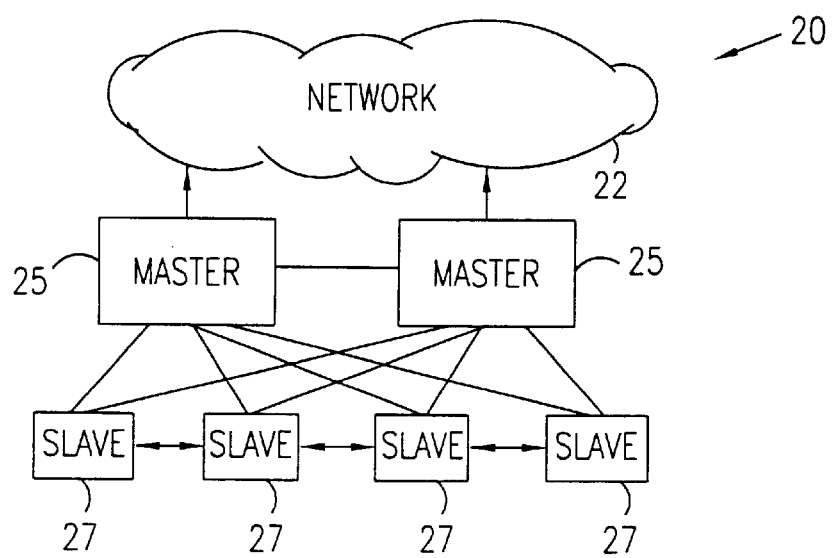

System 31 comprises two mutually-linked masters 30 and 32, both of which are generally capable of performing the functions of master 25, including interfacing to network 22 and higher-level routing functions, as shown in FIG. 1 and described with reference thereto. A plurality of slaves 34 are connected between masters 30 and 32 by lines 38 in a number of daisy chains 36, 37 and 39. Each slave comprises multiple subscriber ports 28, which link system 31 to respective subscriber locations. Although three chains are shown in FIG. 2, each comprising four slaves 34, it will be appreciated that masters 30 and 32 may also be configured to accommodate greater or smaller numbers of chains and/or slaves. An advantage of the architecture of system 31 is that additional slaves may be added to the chains as needed, without having to change the number of interfaces associated with masters 30 and 32.

Master 30 is termed the active master, because in normal operation of system 31, i.e., in the absence of faults in the system, downstream traffic from the network is routed from master 30 down chains 36, 37 and 39 to the respective slaves 34. Upstream traffic from the slaves is likewise routed up the chains to master 30. Active master 30 bicasts upstream packets to the network and to standby master 32. The standby master conveys copies of the upstream packets to the network, as well, as protection against a failure in the network interface of active master 30. In case of a fault in one of chains 36, 37 or 39, as described further hereinbelow, the traffic direction in all or a part of the faulty chain is reversed. Packets are then directed between some of the slaves and standby master 32, rather than directly between the slaves and active master 30. When a serious failure occurs in the active master, all traffic may be directed through the standby master.

Figure 4:
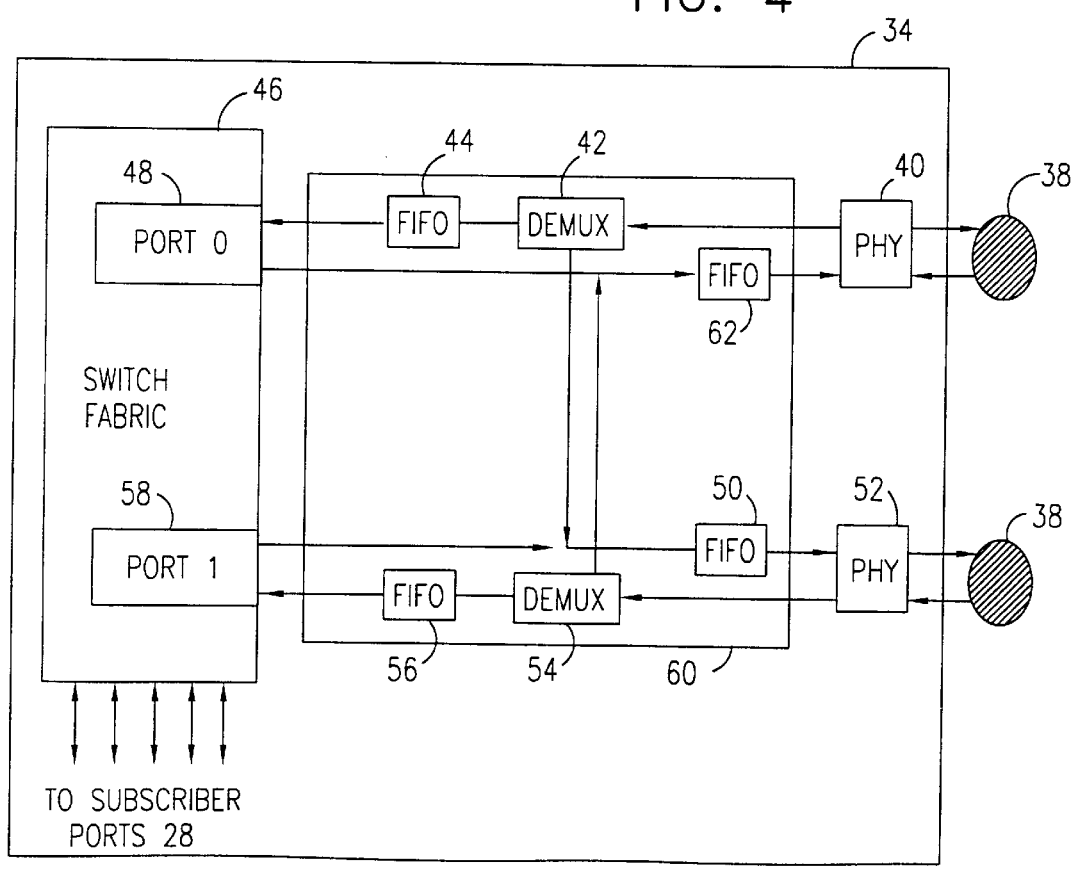
FIG. 4 is a block diagram that schematically illustrates a pre-switch used in a slave unit of a multi-shelf access system, in accordance with a preferred embodiment of the present invention.

FIG. 4 is a block diagram that schematically illustrates details of one of slaves 34, showing particularly a pre-switch 60 in the slave, in accordance with a preferred embodiment of the present invention. This embodiment makes use of a pre-switch addressing scheme to facilitate traffic switching at the shelves. Every packet sent between masters 30 and 32 and slaves 34 has a pre-switch address (PSA), which identifies the packet as either:

1. A packet to/from a distinct slave shelf;
2. A broadcast/multicast packet; or
3. A packet for immediate neighbor (also called "Next" address, because it addresses the next element along a chain).

Pre-switch 60 processes packets according to their respective PSAs, as described further hereinbelow.

A PSA need not be unique over the entire multi-shelf system 31. Uniqueness is required, however, within any single chain 36, 37 or 39. If PSA is not unique at the entire multi-shelf system level, another bit must be allocated to distinguish between ordinary traffic and protection traffic packets. Protection traffic arises, as described hereinbelow, in situations wherein one of the chains delivers traffic for a shelf on another chain in which a fault has occurred.

The PSA is implemented either by appending some extra bits to every packet, or by using part of an already existing packet header. Specifically, for ATM implementation, the GFC portion of the standard ATM cell header is preferably used to accommodate the PSA. GFC is a four-bit field, of which three bits may be used for the PSA, and the remaining bit to indicate protection traffic. Using the GFC for the PSA limits the number of VPIs that can be allocated per slave shelf to 256. This limitation is most often acceptable, as it still allows at least one VPI per user. Alternatively, if more VPIs are required, extra bits may be appended to every cell.

The "Next" (neighbor) address is used for various topology detection and diagnostic procedures. Typically, each shelf sends control packets with the "Next" address, carrying the identity of the sending shelf identity, as well as the identity of the neighbor as received over the link and, optionally, additional information.

Referring back to FIG. 4, downstream data packets from active master 30 on line 38 are received by a first physical layer interface 40 and passed to a first demultiplexer 42 in pre-switch 60. The demultiplexer examines the PSA of the packets and, depending on this examination, takes the following actions:

If the PSA corresponds to this slave 34, a port number (PORT 0) is appended to the packet. This port is identified schematically in FIG. 4 by a block 48 in a switch or switching fabric 46 of the slave. A demultiplexer 42 passes the packet to an input FIFO 44, from which it is conveyed to switching fabric 46, which then routes the packet to the appropriate port 28.

If the packet is a broadcast packet, sent to slave 34, as well as to other slaves, the demultiplexer passes a copy of the packet, with the appropriate port number, to input FIFO 44, and switching fabric 46 routes the packet to the appropriate port, as described above. Another copy of the packet is passed to an output FIFO 50, from which it is sent through a second physical layer interface 52 over line 38 to the next slave in the chain.

If the PSA does correspond to this slave 34, demultiplexer 42 passes the packet to output FIFO 50 and from there through interface 52 and line 38 to the next slave in the chain.

If the packet carries a "Next" neighbor address, the demultiplexer passes the packet to input FIFO 44 and from there to switching fabric 46.

In this manner, pre-switch 60 relieves switching fabric 46 of the need to deal with any packets that are not addressed to ports 28 of the particular slave 34.

Upstream data packets are handled in an analogous fashion. Such packets are received by physical layer interface 52 and are passed to a second demultiplexer 54 in pre-switch 60. In this case, too, the pre-switch examines the packets to determine whether they carry a PSA corresponding to this slave 34. If so, another port number (PORT 1) of the slave is appended to the packet, identified by a block 58. In this case, the packets are passed to an input FIFO 56 and from there are conveyed to switching fabric 46 for routing to the appropriate port 28. Otherwise, the packets are sent to an output FIFO 62, for transmission upstream via physical layer interface 40.

Packets that are received by slave 34 from ports 28 are passed by switch fabric 46 to output FIFO 62, as appropriate, for transmission back to active master 30. Alternatively, when a fault has occurred, the upstream packets from the ports are passed via FIFO 50 to standby master 32.

Because of the essential symmetry of slave 34 and particularly of pre-switch 60, the reversal in the direction of data flow over line 38 is accomplished without reprogramming look-up tables in switching fabric 46. It is necessary only to swap ports 0 and 1. The swap affects packets both received and transmitted by the slave, but it has no effect on through traffic, which is passed by demultiplexers 42 and 54 to respective output FIFOs 50 and 62 in any case. Should a fault occur in switch fabric 46 or elsewhere in slave 34, so that the slave is unable to transfer packets to or from its ports 28, pre-switch 60 simply passes all packets through to the next slaves (or master) up and down the chain. The effect of the fault is thus limited to the subscribers served by the particular slave, and other subscribers served by system 31 are substantially unaffected.

Although the operation of pre-switch 60 is described herein in the context of system 31, it will be appreciated that the principles embodied in the pre-switch may similarly be applied, mutatis mutandis, in other multi-shelf access architectures. The pre-switching technique is particularly useful when slave shelves are daisy-chained together, even when the chain is not closed as it is in system 31.

Figure 5:
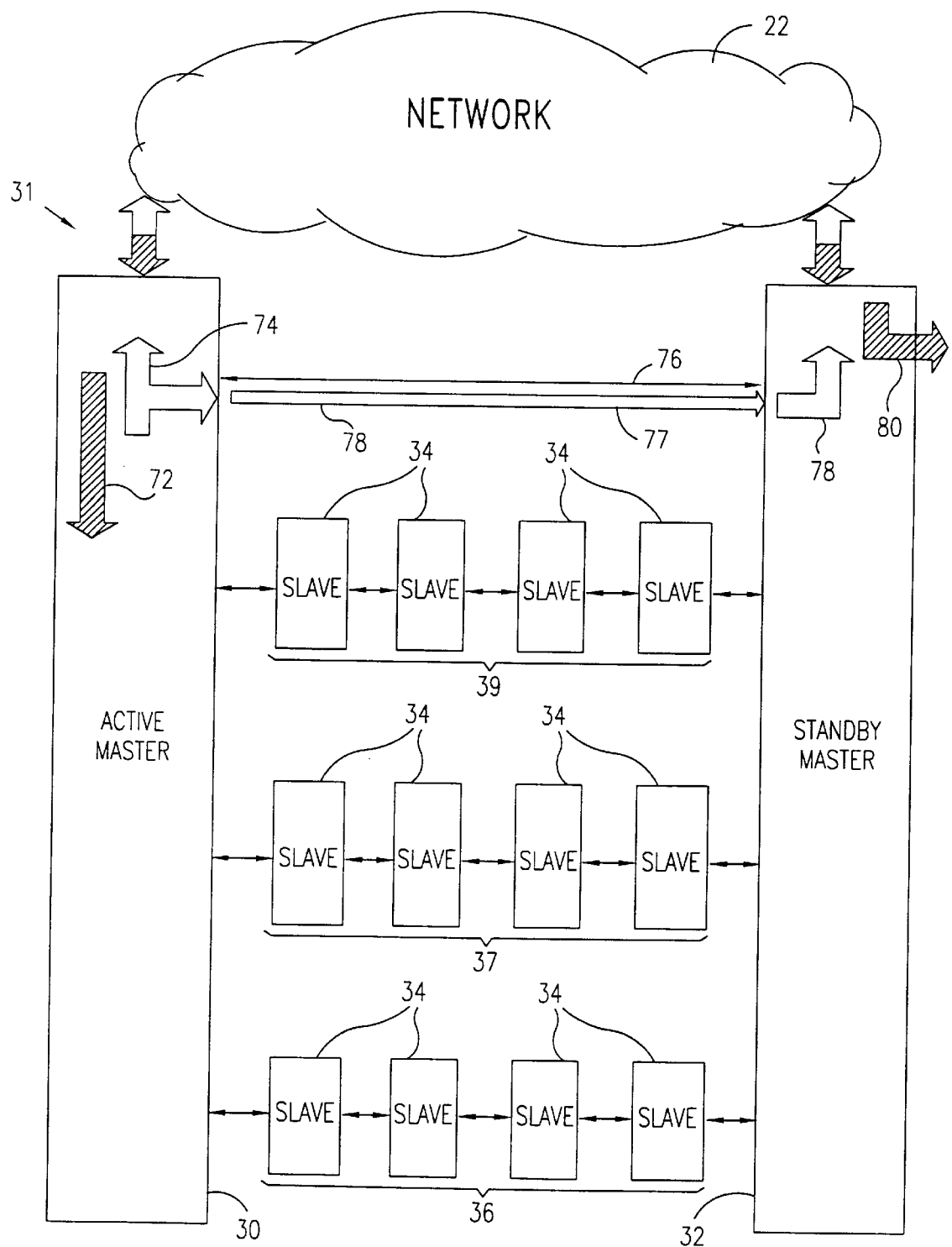
FIG. 5 is a block diagram that schematically illustrates data flow in a multi-shelf access system under normal operating conditions, in accordance with a preferred embodiment of the present invention.

FIG. 5 is a block diagram that schematically illustrates details of data packet flow in system 31 under normal, fault-free conditions, in accordance with a preferred embodiment of the present invention. Hatched arrows, such as an arrow 72, represent downstream data flow, while unfilled arrows, such as an arrow 74, represent upstream data flow. Packets received from network 22 are routed by active master 30 down each of chains 36, 37 and 39, as indicated by arrow 72. Standby master 32 normally discards these downstream packets, as indicated by an arrow 80, except when a fault occurs in the active master.

Upstream packets, received by slaves 34 from their respective ports, are passed up the respective chains to active master 30. The active master bicasts these packets, sending them both to network 22 and to standby master 32 over a protection interface 76 between the two masters, as indicated by an arrow 77. The standby master also transmits the upstream packets over network 22, as indicated by an arrow 78. This redundancy in transmission is in accordance with fault protection mechanisms used in high-speed networks known in the art, such as the standard "1+1 APS" (automatic protection switching) technique used in SONET.

Figure 6:
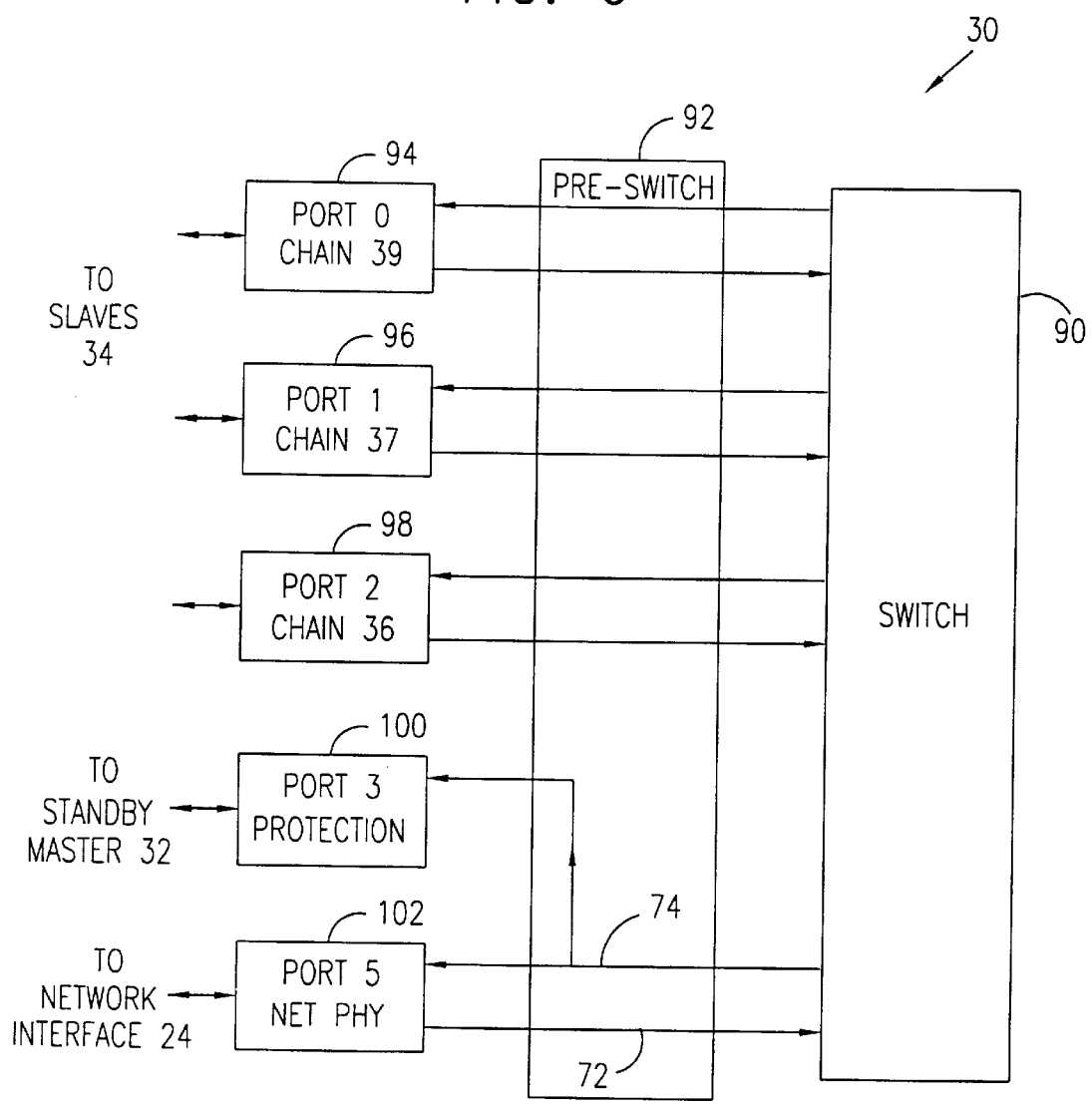
FIG. 6 is a block diagram that schematically illustrates details of an active master in the system of FIG. 5, in accordance with a preferred embodiment of the present invention.

FIG. 6 is a block diagram that schematically shows details of active master 30 in normal operation, in accordance with a preferred embodiment of the present invention. Master 30 comprises a main switch 90 and a pre-switch 92. The main switch receives downstream (incoming) packets from the network physical layer interface (NET PHY). The network interface has a switching address 102, corresponding to a switch port no. 5. (For the particular case of ATM switching, this and the other port numbers in the figure preferably correspond to UTOPIA addresses.) The packets are distributed to chains 36, 37 and 39 at respective addresses 98, 96 and 94 (switch ports 2, 1 and 0). Upstream packets are delivered to address 102 for transmission over the network. Pre-switch 92 bicasts these packets, as described hereinabove, to an address 100 (switch port 3) of protection interface 76 to standby master 32. Input packets to master 30 from the protection interface are discarded by pre-switch 92. Other than these protection functions, the pre-switch operates as a transparent pass-through, as shown in FIG. 6, as long as no faults have occurred in system 31.

Figure 7:
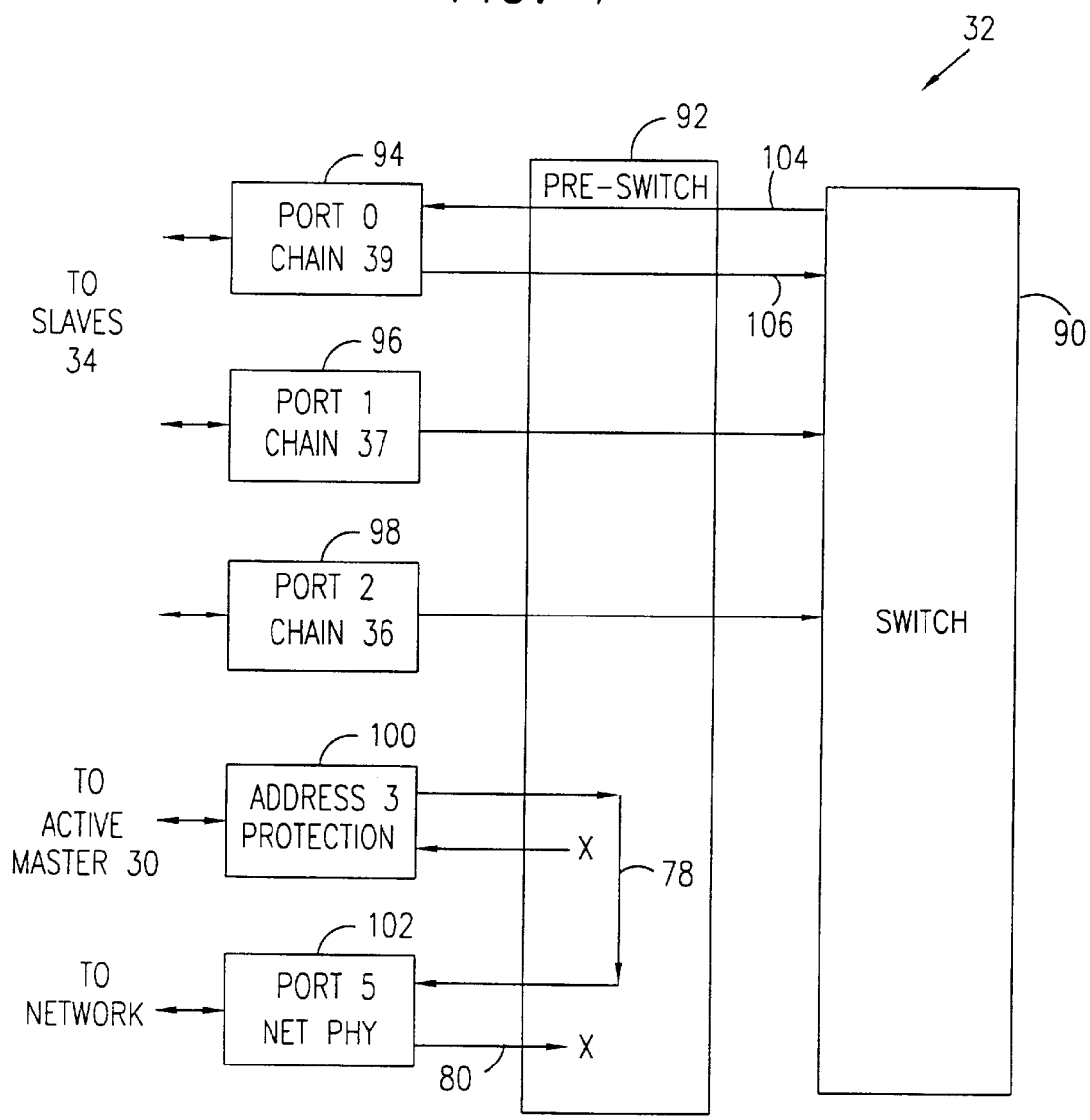
FIG. 7 is a block diagram that schematically illustrates details of a standby master in the system of FIG. 5, in accordance with a preferred embodiment of the present invention.

FIG. 7 is a block diagram that schematically shows details of standby master 32, in accordance with a preferred embodiment of the present invention. The standby master is structurally substantially identical to the active master, including main switch 90 and pre-switch 92. In normal operation, as shown in the figure, standby master 32 communicates only with active master 30, and is not expected to receive packets from or convey packets to any of slaves 34. Control traffic between the active and standby masters is preferably conveyed through chain 39, over an upstream path 104 and a downstream path 106 through the chain. Upstream data packets received by the standby master at address 100, over protection interface 76 from active master 30, are conveyed by pre-switch 92 to the network physical layer interface at address 102. The pre-switch passes any traffic from chains 36 and 37 transparently to switch 90, which treats any packets that it receives, except for control packets, as misrouted traffic.

Optionally, active master 30 and standby master 32 include their own local ports (not shown in the figures). In this case, the standby master is preferably treated as an additional slave on one of the chains, typically chain 39, and its ports have the same setup as all of the slave ports. Only the local ports of the active master have a different setup. The ports on the standby master are preferably assigned their own PSA, reducing by one the number of slaves that can be added on chain 39. Data traffic to and from the local ports on the standby master are carried over paths 106 and 104, in addition to the control traffic. Because protection interface 76 is reserved and, preferably, hardware-switched to deal with fault situations, it is undesirable to use this interface for the ordinary data and control traffic between the active and standby masters.

Figure 8:
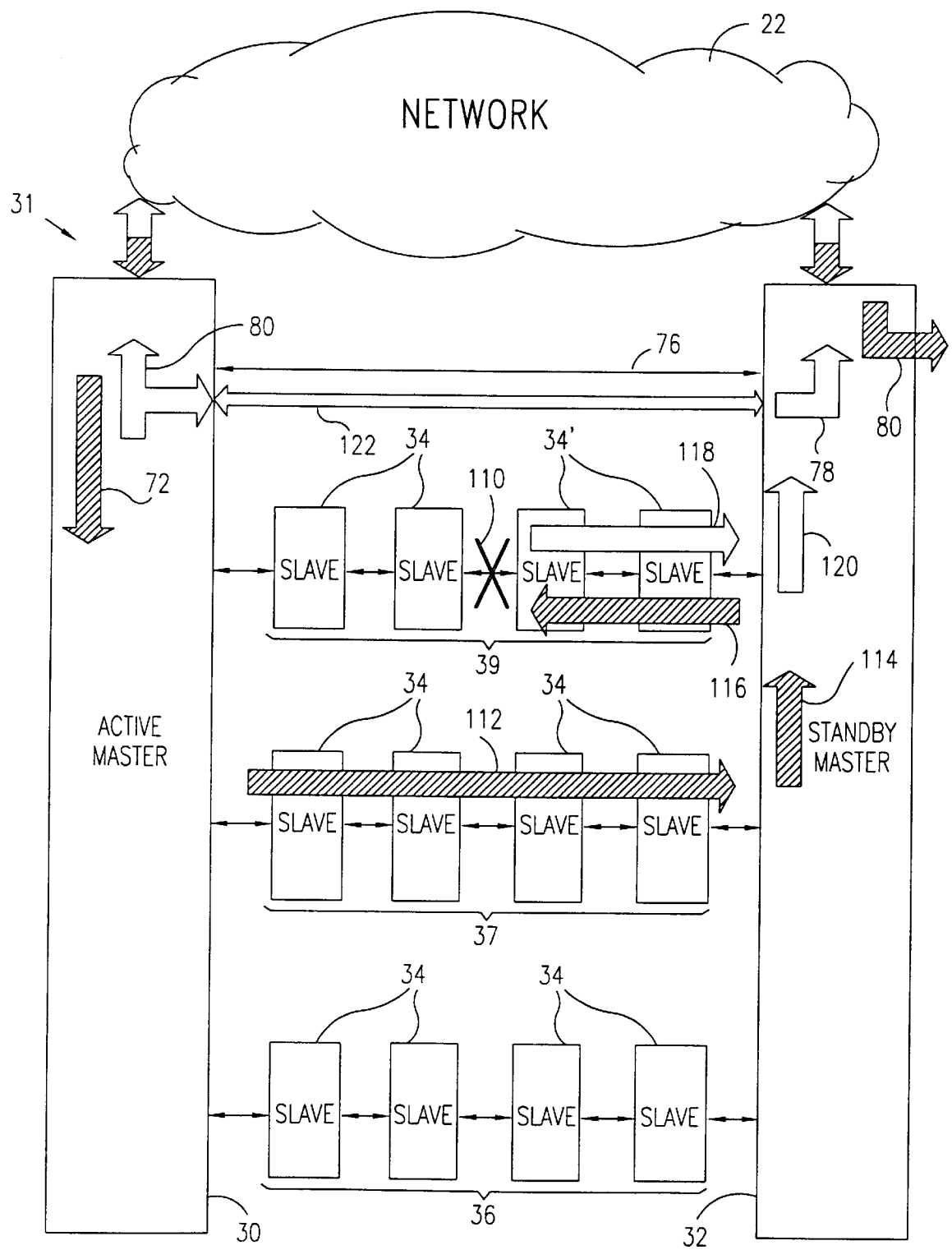
FIG. 8 is a block diagram that schematically illustrates data flow in the system of FIG. 5 under fault conditions, in accordance with a preferred embodiment of the present invention.

FIG. 8 is a block diagram that schematically illustrates operation of system 31 in the event of a communication fault in chain 39, in accordance with a preferred embodiment of the present invention. The fault is indicated by a mark 110 between two of slaves 34 and 34' in the chain, between which communications have been interrupted. In multi-shelf topologies known in the art, such as those shown in FIGS. 2A–2C, such a fault would result in interruption of service to subscribers served by all of slaves 34' downstream of the fault. In system 31, however, active master 30 recognizes that a fault has occurred, and commands standby master 32 and slaves 34 to take corrective action.

Downstream traffic for slaves 34' is routed by active master 30 through chain 37, as indicated by an arrow 112. Standby master 32 switches this traffic onto chain 39, as shown by arrows 114 and 116, so that the packets reach slaves 34'. The addresses of the two inputs to the pre-switches 60 of slaves 34' are swapped, as described hereinabove (FIG. 4), in order to reverse the direction of traffic flow on this portion of chain 39. Upstream packets returned by slaves 34' are routed back to standby master 32, as shown by an arrow 118. The standby master switches this traffic over protection interface 76 to active master 30, as indicated by arrows 120 and 122. From this point, the upstream traffic is transmitted over network 22 in normal fashion. Traffic to and from slaves 34 on chains 36 and 37 is substantially unaffected. Failures in chains 36 and 37 are handled in similar fashion.

Figure 9:
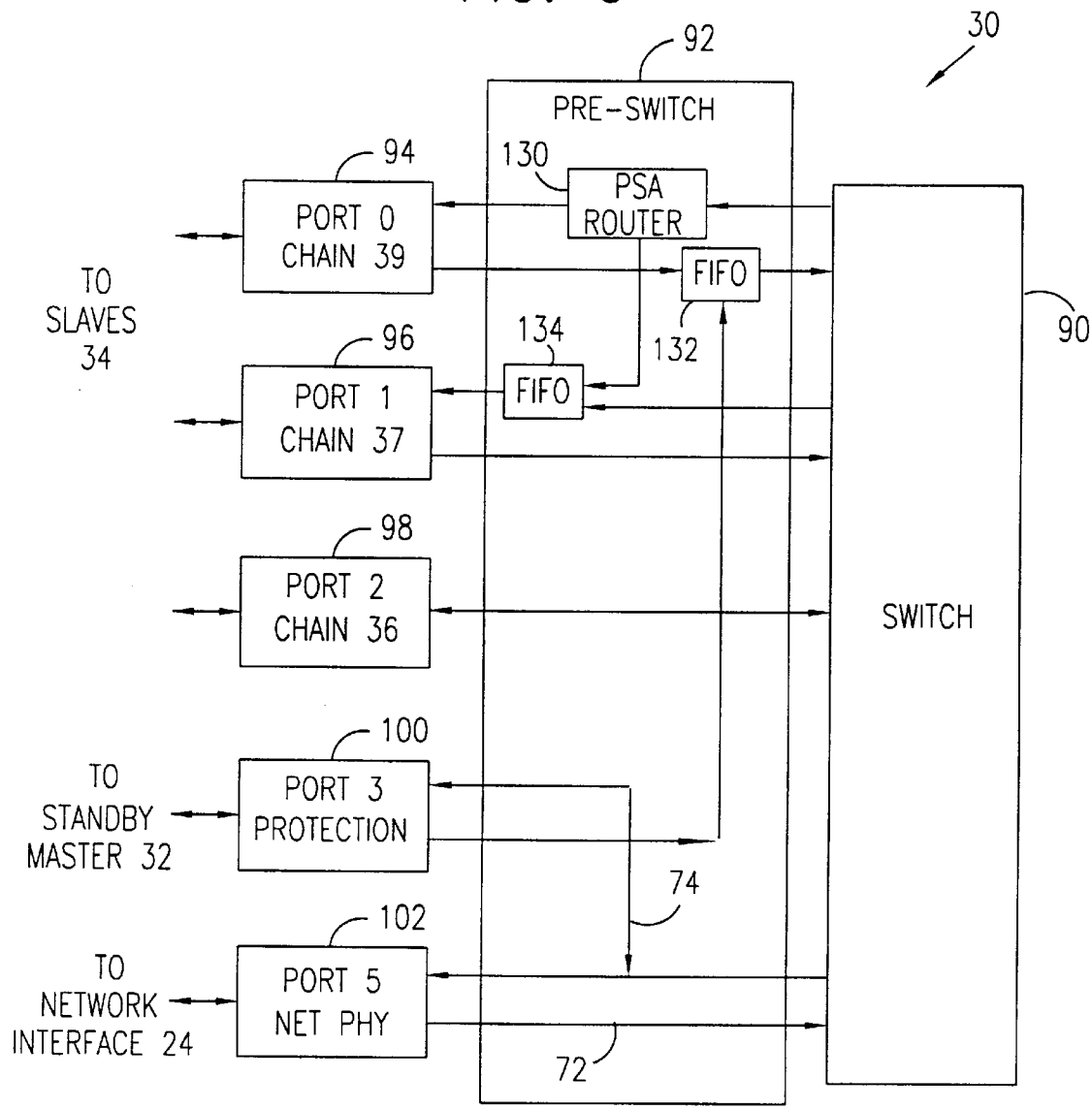
FIG. 9 is a block diagram that schematically illustrates details of the active master in the system of FIG. 5 under the fault conditions of FIG. 8, in accordance with a preferred embodiment of the present invention.

FIG. 9 is a block diagram that schematically illustrates details of the operation of pre-switch 92 in active master 30 under the fault conditions shown in FIG. 8, in accordance with a preferred embodiment of the present invention. For clarity of illustration, this block diagram and the other illustrations of pre-switch 92 show only the elements of the pre-switch that are of functional importance in handling this particular fault. The illustrated arrangement of these elements, and particularly of FIFO buffers in the pre-switch, has been chosen for simplicity and conceptual clarity, and variations on this arrangement will be apparent to those skilled in the art.

For all incoming traffic destined for chain 39, a PSA router 130 in pre-switch 92 determines whether the packets are addressed to slaves 34, upstream of the fault indicated by mark 110, or slaves 34', downstream of the fault. The PSA re-routes the traffic for slaves downstream of the fault through chain 37, in accordance with the following routing table:

TABLE I

| PSA address | Original switch port | New switch port |
| --- | --- | --- |
| 0 | 0 | 0 |
| 1 | 0 | 0 |
| 2 | 0 | 1 |
| 3 | 0 | 1 |
| 4 | 0 | 0 |
| 5 | 0 | 0 |
| 6 | 0 | 1 |

In this table, PSA numbers 2 and 3 refer to slaves 34', whose traffic is thus routed via a FIFO 134 to address 96 (switch port 1) of chain 37. Broadcast traffic for chain 39 is routed by PSA router 130 to both chains 39 and 37, except for "Next" packets, which are sent only to chain 39.

As noted hereinabove, it is necessary to avoid confusion between downstream traffic to slaves 34', transferred on chain 37 as represented by arrow 112, and ordinary downstream traffic to slaves 34 located on chain 37 itself. For this reason, PSA router 130 preferably sets a bit reserved for this purpose in the packets destined for slaves 34'. In the case of ATM cells, for example, router 130 preferably sets the least significant bit of the GFC field to 1. Standby master 32 changes this bit back to 0 when switching the packets back to chain 39.

In the upstream direction, the traffic from slaves 34' over protection interface 76, represented by arrow 122, is merged with the normal upstream traffic from slaves 34 on chain 39 by a FIFO 132. Switch 90 processes the merged traffic as though it had all come directly from chain 39, and no special processing is required after pre-switch 92.

FIG. 10 is a block diagram that schematically illustrates details of pre-switch 92 in standby master 32 under the fault conditions of FIGS. 8 and 9, in accordance with a preferred embodiment of the present invention. Downstream traffic from chain 37 is examined by a local filter 148 in pre-switch 92 of standby master 32. The filter identifies packets destined for slaves 34', preferably based on the least significant bit of the GFC field in the packets, as noted above, and routes these packets to address 94 (UTOPIA port 0) of chain 39. The local filter changes the least significant bits back to 0. Packets for local ports on the standby master are routed to a FIFO 144, from which they are conveyed to switch 90. Other packets, typically "next" traffic originating from the last slave 34 on chain 37, are passed by filter 148 directly to switch 90.

Traffic arriving at standby master 32 from chain 39 is received by a next filter 142, which separates normal packet traffic from "Next" neighbor packets. The filter routes upstream packets, sent by slaves 34', to a FIFO 150. From this FIFO, these packets are conveyed through address 100, via protection interface 76, to active master 30. Upstream traffic from the local ports on the standby master is similarly routed by a next filter 140 to FIFO 150, and from there over the protection interface to the active master. The "Next" packets, however, are routed by filters 140 and 142 directly between the standby master and chain 39.

While FIGS. 8, 9 and 10 illustrate only a case in which a fault has occurred in chain 39, it will be understood that similar techniques may be applied when faults occur in chains 36 and 37. In fact, these latter cases are simpler to deal with, since control traffic between masters 30 and 32 is normally carried only over chain 39. In all cases, the use of pre-switches 92 in the two masters allows such faults to be handled substantially without any reprogramming or reconfiguration of switches 90.

Although preferred embodiments are described hereinabove with reference to DSL access to an ATM network, the principles of the present invention are similarly applicable in providing access to substantially any type of packet-switched network, and over substantially any sort of subscriber interface. The architecture and switching techniques used in system 31 are most advantageous when there is a need for high concentration at the access stage, i.e., for multiplexing of many lines into one or a few trunks. Those skilled in the art, however, will understand that the principles embodied in system 31 may also be applied to multiplexers and switches of other types, even including core network devices.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. Network access apparatus, comprising:
   first and second master units, each comprising a physical interface to a packet-switched network;
   a plurality of slave units, each slave unit comprising one or more ports to respective subscriber lines; and
   a plurality of physical interface lines, which link the slave units in one or more daisy chains, in which the slave units are mutually connected in series by the physical interface lines therebetween, each daisy chain comprising at least a first slave unit connected one of the physical interface lines to the first master unit, a second slave unit connected to the first slave unit but not to the first or second master unit, and a last slave unit connected by another of the physical interface lines to the second master unit.

2. Apparatus according to claim 1, wherein the network comprises an asynchronous transfer mode (ATM) network.

3. Apparatus according to claim 1, wherein the network comprises an Internet protocol (IP) network.

4. Network access apparatus, comprising:
   first and second master units, each comprising a physical interface to a packet-switched network;
   a plurality of slave units, each slave unit comprising one or more ports to respective subscriber lines; and
   a plurality of physical interface lines, which link the slave units in one or more daisy chains, in which the slave units are mutually connected in series by the physical interface lines therebetween, each daisy chain comprising at least a first slave unit connected by one of the physical interface lines to the first master unit and a last slave unit connected by another of the physical interface lines to the second master unit,
   wherein in normal operation, downstream data packets received from the network are passed from the first master unit to each of the daisy chains via the first slave unit in each chain, and upstream data packets received by the slaves in each chain from the subscriber lines are passed via the first slave unit in the chain to the first master unit for transmission over the network.

5. Apparatus according to claim 4, and comprising a protection interface, which couples the second master unit to the first master unit, and over which interface data packets are conveyed between the first and second master units in case of a fault.

6. Apparatus according to claim 5, wherein the first master unit bicasts the upstream data packets that it receives from the slave units to the network and, via the protection interface, to the second master unit, which transmits the upstream data packets to the network.

7. Apparatus according to claim 4, wherein in case of a fault at a location in one of the daisy chains, data flow in a portion of the daisy chain between the location of the fault and the second master unit is reversed, so that the downstream data packets are passed from the second master unit to the slave units in the portion of the daisy chain via the last slave unit in the chain, and the upstream data packets are passed by the last slave unit to the second master unit.

8. Apparatus according to claim 7, wherein the downstream packets for the slave units in the portion of the daisy chain between the location of the fault and the second master unit are conveyed to the second master unit from the first master unit via another one of the daisy chains.

9. Network access apparatus, comprising:
   first and second master units, each comprising a physical interface to a packet-switched network;
   a plurality of slave units, each slave unit comprising one or more ports to respective subscriber lines; and
   a plurality of physical interface lines, which link the slave units in one or more daisy chains, in which the slave units are mutually connected in series by the physical interface lines therebetween, each daisy chain comprising at least a first slave unit connected by one of the physical interface lines to the first master unit and a last slave unit connected by another of the physical interface lines to the second master unit,
   wherein each of the first and second master units comprises:
      a switch, configured to route data packets between the respective physical interface and the one or more daisy chains; and
      a pre-switch, which in the event of a fault at a location in one of the daisy chains, re-routes at least a portion of the data packets exchanged with one or more of the slaves in the daisy chain in which the fault has occurred through another one of the daisy chains.

10. Apparatus according to claim 9, wherein the pre-switch re-routes the data packets such that substantially no reconfiguration of the switch is required responsive to the fault.

11. Network access apparatus, comprising:
    first and second master units, each comprising a physical interface to a packet-switched network;

a plurality of slave units, each slave unit comprising one or more ports to respective subscriber lines; and a plurality of physical interface lines, which link the slave units in one or more daisy chains, in which the slave units are mutually connected in series by the physical interface lines therebetween, each daisy chain comprising at least a first slave unit connected by one of the physical interface lines to the first master unit and a last slave unit connected by another of the physical interface lines to the second master unit, wherein each of the slave units comprises:

a switch fabric comprising one or more switches, which convey data packets to respective ports on the switch to which the packets are addressed; and a pre-switch, which receives the data packets from one of the physical interface lines connected to the slave unit and passes those of the data packets that are addressed to any of the ports on the slave unit to the switch fabric, while passing packets not addressed to any of the ports on the slave unit for output through another of the physical interface lines.

12. Apparatus according to claim 11, wherein each of the slave units is coupled to receive packets transferred thereto from the first and second master units over first and second ones of the physical interface lines, respectively, and wherein the pre-switch passes the packets received through the first and second physical interface line and addressed to any of the ports on the slave unit to respective first and second addresses in the switch fabric.

13. Apparatus according to claim 12, wherein in response to a reversal of a direction of data flow in the daisy chain, the first and second addresses are swapped in the pre-switch, so that substantially no reconfiguration of the switch fabric is required.

14. In a network access multiplexing system, in which a master unit is connected by a physical interface to a packet-switched network, a slave unit configured to be coupled to the master unit in a daisy chain of such slave units, the slave unit comprising:

a plurality of ports, for coupling the slave unit to respective subscriber lines;

first and second physical interfaces, coupled to exchange packets with preceding and succeeding units, respectively, along the daisy chain;

a pre-switch, coupled to receive packets from the first physical interface and responsive to address data carried by the packets, to sort the packets such that packets addressed to the slave unit are retained, and packets addressed to the succeeding units are passed to the second physical interface; and a fabric of one or more switches, which convey the retained packets to the ports, responsive to the address data.

15. The slave unit according to claim 14, wherein the pre-switch is further coupled to receive packets transferred thereto from the second physical interface and to sort the packets in like manner to the packets received through the first physical interface.

16. The slave unit according to claim 15, wherein the retained packets that were received from the first and second physical interfaces and are passed by the pre-switch to the switch fabric are identified by respective first and second port numbers, and wherein in response to a reversal of a direction of data flow in the daisy chain, the first and second port numbers are swapped in the pre-switch, so that substantially no reconfiguration of the switch fabric is required in response to the reversal.

17. The slave unit according to claim 14, wherein when one of the packets received by the pre-switch comprises a multicast packet addressed to one or more of the ports on the slave unit, the pre-switch sorts the multicast packet such that one copy of the packet is retained and another copy of the packet is passed to the second physical interface.

18. The slave unit according to claim 14, wherein in the event of a fault in the switch fabric, the pre-switch continues to pass the packets addressed to the succeeding units on to the succeeding units without significant interruption.

19. A method for providing access to a network, comprising:

coupling first and second master units to interface with the network;

linking a plurality of slave units, each slave unit comprising one or more ports to respective subscriber lines, in a daisy chain between the first and second master units;

conveying initial downstream data packets, received from the network by one of the master units, along the daisy chain in a first direction, so as to deliver the packets to the ports of the slave units; and in the event of a fault in the daisy chain, conveying further downstream data packets, received from the network by one of the master units, along the daisy chain in a second direction, opposite to the first direction, so as to deliver the further packets to the ports of at least some of the slave units.

20. A method according to claim 19, wherein the initial and further downstream packets are received from the network by the first master unit, and wherein conveying the further downstream packets in the second direction comprises conveying the further downstream packets from the first master unit to the second master unit, and then conveying the further downstream packets from the second master unit to the daisy chain.

21. A method according to claim 20, wherein conveying the further downstream packets from the first master unit to the second master unit comprises linking further slave units in an additional daisy chain between the first and second master units, and conveying the further downstream packets from the first master unit to the second master unit over the additional daisy chain.

22. A method according to claim 19, and comprising conveying initial upstream data packets, received by the slave units from the subscriber lines, along the daisy chain in the second direction so as to transmit the upstream data packets via the first master unit over the network, and in the event of the fault, conveying further upstream data packets received by one or more of the slave units along the daisy chain in the first direction via the second master unit.

23. A method according to claim 22, and comprising bicasting the upstream data packets from the first master unit to the network and to the second master unit, which transmits the bicast upstream data packets over the network.

24. A method according to claim 19, wherein conveying the initial downstream data packets along the daisy chain comprises pre-switching the packets at each of the slave units, so that packets not addressed to any of the ports on the slave unit are passed to the next slave unit in the daisy chain, while packets that are addressed to one or more of the ports on the slave unit are passed to a switch fabric that directs the packets to the ports to which they are addressed.

25. A method according to claim 19, wherein the network comprises an asynchronous transfer mode (ATM) network.

26. A method according to claim 19, wherein the network comprises an Internet protocol (IP) network.

* * * * *